Patented July 7, 1936

2,046,862

UNITED STATES PATENT OFFICE 2,046,862

CELERY SALT

Hugh E. Allen, Evanston, Ill., assignor of one-half to Albert G. McCaleb, Evanston, Ill.

No Drawing. Application January 24, 1936,
Serial No. 60,642

4 Claims. (Cl. 99—143)

My invention contemplates and provides a snow-white celery salt which comprises minute particles of the oil of celery (by which I mean the essential oil distilled or otherwise extracted from celery seeds) interspersed with finely divided sodium chloride in a relationship such that the salt does not cause deterioration of the oil.

Oil of celery deteriorates when in intimate contact with sodium chloride,—i. e., loses its potency as to aroma and flavor, takes on an undesirable color, and slowly but inevitably breaks down to rancidity. Therefore, and although oil of celery, as such, has been readily available for many years, its employment in a celery salt was not good practice until after the advent of the present invention.

Heretofore the celery salt of commerce has been produced by the simultaneous grinding of celery seeds and common salt, or, alternatively, by grinding of the seeds alone followed by their intermixture with common salt. Celery salt thus produced has had this advantage: the celery oil, being in the seed fibers, has been substantially protected, by the fibers, from the deleterious effects of the salt. But such old style celery salt has presented this concomitant and very serious disadvantage: the celery oil, being in the seed fibers, makes but feeble impression upon the palate and nostrils of the consumer—unless the ground seeds constitute an inordinately large part of the finished product. Celery seeds are relatively expensive—salt is relatively inexpensive. Therefore, the cost involved in giving old style celery salt its characteristic flavor and aroma has been so substantial as greatly to limit its use in the food industries. Moreover, the large quantities of seed fiber, which it has been necessary to use, have given the finished product an undesirable mottled or grayish appearance.

The necessary constituents of the celery salt of the present invention are oil of celery, mono-sodium glutamate and sodium chloride in percentages (by weight) substantially as follows:

Celery oil _____ $\tfrac{1}{10}$ of 1% to 1%
Mono-sodium glutamate _____ 2% to 6%
Sodium chloride _____ the remainder The sodium chloride should be rather finely granular but, in order to obtain best results, should be neither pulverulent nor semi-pulverulent. The mono-sodium glutamate, on the other hand, should consist of particles much finer than the granules of the salt, i. e., the mono-sodium glutamate should be pulverulent, or at any rate, semi-pulverulent.

The celery oil is preferably first thoroughly intermixed with the mono-sodium glutamate, and this intermediate mixture is then commingled with the sodium chloride to produce the finished product. While satisfactory results may be obtained by violent agitation of the mono-sodium glutamate while and after the celery oil is slowly poured into it, the most satisfactory intermediate is obtained by placing the mono-sodium glutamate in a hammer mill, slowly adding the celery oil while the mill operates, and then continuing the operation of the mill for several minutes to divide the celery oil into minute globules which literally are pounded into intimate physical relationship with the very minute particles of the mono-sodium glutamate. The introduction of the intermediate into the sodium chloride is satisfactorily accomplished in a power mixer of any approved design.

The celery salt produced as above described is snow-white because both the sodium chloride and the mono-sodium glutamate are white and the celery oil colorless. The characteristic flavor and odor of the celery oil are strongly and pleasingly presented by the finished product, even though its actual content of celery oil may be quite small,—this for the reason that the mono-sodium glutamate has the peculiar faculty of pleasingly modifying and accentuating, or "bringing out" in the parlance of the food industry, the natural flavor and aroma of the celery oil. Moreover, the celery oil will be found uniformly distributed throughout the finished product, even after it has stood undisturbed in a deep container for an extended period of time. But of greatest practical importance is the fact that the celery oil content of my new celery salt is in no way injuriously affected by the sodium chloride. Its colorless character is not perceptibly modified. It does not become rancid. This immunity of the celery oil from deleterious effects of the sodium chloride seems to indicate that the mono-sodium glutamate has an affinity for celery oil which is not evidenced by sodium chloride; that each minute globule of celery oil establishes a firm physical union (akin to adsorption) with minute particles of mono-sodium glutamate; and that the minute particles of mono-sodium glutamate not only have no injurious effect upon the celery oil, but also shield the celery oil from the sodium chloride by holding the minute globules of celery oil away from the surrounding granules of sodium chloride.

Having thus described my invention, what I claim is new and desire to secure by Letters Patent of the United States is:

1. As a new composition of matter a celery salt comprising a major quantity of sodium chloride thoroughly intermixed with minor quantities of celery oil and mono-sodium glutamate.

2. As a new composition of matter a celery salt comprising a major quantity of sodium chloride thoroughly intermixed with a lesser quantity of mono-sodium glutamate and a least quantity of celery oil.

3. A celery salt consisting of a uniform mixture of a major quantity of granular sodium chloride, a lesser quantity of mono-sodium glutamate which is more finely divided than the sodium chloride, and a least quantity of celery oil.

4. As a new composition of matter a celery salt consisting of a uniform intermixture of the following ingredients in percentages as follows, to-wit: celery oil $\frac{1}{10}$ of 1% to 1%; mono-sodium glutamate 2% to 6%; sodium chloride, the remainder.

HUGH E. ALLEN.